(12) United States Patent
Sonoda

(10) Patent No.: US 6,181,782 B1
(45) Date of Patent: Jan. 30, 2001

(54) PERSONAL DIGITAL ASSISTANCE DEVICE

(75) Inventor: Isao Sonoda, Soraku-gun (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/237,069

(22) Filed: Jan. 25, 1999

(30) Foreign Application Priority Data

Jan. 26, 1998 (JP) .................................................. 10-012239

(51) Int. Cl.[7] .................................................. H04M 11/00
(52) U.S. Cl. .................................... 379/90.01; 379/93.05; 379/110.01
(58) Field of Search .............................. 379/90.01, 93.05, 379/93.36, 100.14, 93.26, 110.01, 93.07

(56) References Cited

U.S. PATENT DOCUMENTS

| | | | |
|---|---|---|---|
| 5,588,054 | * 12/1996 | Shin et al. | 379/102.04 |
| 5,675,524 | * 10/1997 | Bernard | 364/705.05 |
| 5,835,732 | * 11/1998 | Kikinis et al. | 395/281 |
| 6,084,954 | * 7/2000 | Harless et al. | 379/140 |

FOREIGN PATENT DOCUMENTS 59-23664   2/1984   (JP) .

* cited by examiner

*Primary Examiner*—Duc Nguyen
*Assistant Examiner*—Melur Ramakrishnaiah
(74) *Attorney, Agent, or Firm*—Dike, Bronstein, Roberts & Cushman, LLP; David G. Conlin; William J. Daley, Jr.

(57) ABSTRACT

A device of the present invention is a personal digital assistance device for communicating with another device via a telephone line which includes: a connection section for connecting the personal digital assistance device to the telephone line; a communication section for dialing a telephone number of the other device for communication with the other device via the telephone line to which the personal digital assistance device is connected by the connection section, for transferring data between the devices, and for disconnecting the telephone line; a control section for controlling the communication section; a voltage detection section for detecting a voltage of the telephone line to which the personal digital assistance device is connected by the connection section; and a determination section for determining whether the voltage detected by the voltage detection section is equal to or greater than a predetermined voltage. When the determination section determines that the voltage detected by the voltage detection section is equal to or greater than the predetermined voltage, the determination section turns on a power supply for supplying a power to the control section.

4 Claims, 5 Drawing Sheets

PERSONAL DIGITAL ASSISTANCE DEVICE

BACKGROUND OF THE INVENTION

1. Field of the Invention:

The present invention relates to a PDA (personal digital assistance) device.

2. Description of the Related Art:

Japanese Laid-Open Patent Publication No. 59-23664 discloses a conventional automatic dialing unit as illustrated in FIG. 5.

The automatic dialing unit illustrated in FIG. 5 includes: a modular jack 2 for connecting the automatic dialing unit to a telephone line 1; a diode rectifier 3 for rectifying a telephone line voltage of the telephone line 1 to the same polarity regardless of the polarity of the telephone line voltage; a constant-voltage power supply circuit 5 for supplying a voltage required for the automatic dialing unit; a RAM 7 for storing a telephone number to be dialed; a backup battery 8 for saving data stored in the RAM 7; a control circuit 6 for receiving from the RAM 7 the telephone number data to be dialed and outputting a dialing signal; a dial switch circuit 4 for outputting a dial pulse signal by opening/closing the telephone line 1 according to the dialing signal received from the control circuit 6; and an associated telephone 9 for closing the telephone line 1 so as to activate the constant-voltage power supply circuit 5.

Referring to FIG. 5, when the associated telephone 9 is placed in the off-hook state, the telephone line voltage of the telephone line 1 activates the constant-voltage power supply circuit 5 via the diode rectifier 3. The constant-voltage power supply circuit 5 supplies to the control circuit 6 a power for operating the control circuit 6.

The control circuit 6 performs automatic dialing by controlling the dial switch circuit 4 according to the telephone number registered in the RAM 7 which saves its data by means of the backup battery 8.

When the associated telephone 9 is placed in the on-hook state, the power supply from the telephone line 1 to the diode rectifier 3 stops, thereby turning off the control circuit 6. In the "off-hook state" as used herein, the handset is taken off the hook, where a voltage of about 48 V is applied to the device. In the "on-hook state" as used herein, the handset is put on the hook, where a voltage of about 4 V is applied to the device.

In recent years, as small note-book PCs and PDA devices have become wide-spread while the PC network/internet environment has expanded with public telephones with a modular jack having become common, the PC communication environment including the internet (inter alia the outdoor communication environment) has been improved. Accordingly, the number of users who use such a communication environment has increased.

The automatic dialing unit illustrated in FIG. 5 performs automatic dialing by a simple and easy operation of placing the handset of the associated telephone in the off-hook state. However, the automatic dialing unit illustrated in FIG. 5 requires an associated telephone for performing automatic dialing, while the function thereof is limited to automatic dialing.

SUMMARY OF THE INVENTION

According to one aspect of this invention, a personal digital assistance device for communicating with another device via a telephone line is provided, which includes: a connection section for connecting the personal digital assistance device to the telephone line; a communication section for dialing a telephone number of the other device, for transferring data between the devices, and for disconnecting the telephone line, thereby communicating with the other device via the telephone line to which the personal digital assistance device is connected by the connection section; a control section for controlling the communication section; a voltage detection section for detecting a voltage of the telephone line to which the personal digital assistance device is connected by the connection section; and a determination section for determining whether the voltage detected by the voltage detection section is equal to or greater than a predetermined voltage. When the determination section determines that the voltage detected by the voltage detection section is equal to or greater than the predetermined voltage, the determination section turns on a power supply for supplying a power to the control section.

In one embodiment of the invention, the personal digital assistance device includes a setting section for setting whether to turn on or off the power supply. When the determination section determines that the voltage detected by the voltage detection section is equal to or greater than the predetermined voltage, the determination section turns on or off the power supply according to a setting made by the setting section.

In another embodiment of the invention, when it is determined that the voltage detected by the voltage detection section is less than the predetermined voltage after the control section has been connected to the other device via the telephone line to which the personal digital assistance device is connected by the connection section, the determination section turns off the power supply.

In still another embodiment of the invention, when the determination section supplies a power to the control section, the determination section instructs the communication section to dial a predetermined telephone number, to transmit predetermined data to the telephone line and then to disconnect the telephone line.

According to the present invention, it is possible to automatically perform a series of communication procedures (i.e., dialing/data transfer/disconnection) by a simple and easy operation of connecting a modular plug/jack to a telephone line.

Moreover, after the modular plug/jack has been connected to the telephone line, it is possible to select whether or not to perform the communication procedures of the present invention. Thus, a user is allowed to select whether or not to perform communication procedures after the user has connected the modular plug/jack.

Furthermore, the power supply of the device is stopped when a voltage equal to or greater than a predetermined voltage is no longer detected. Therefore, the power supply of the device can be stopped by removing the modular plug/jack from the telephone line at any time during or after the communication. Since the power supply of the device is stopped by the removal of the modular plug/jack, the user is prevented from forgetting to turn off the device.

Thus, the invention described herein makes possible the advantage of solving the problems in the prior art by providing a PDA device with a voltage detection section and a control section for controlling the overall communication.

This and other advantages of the present invention will become apparent to those skilled in the art upon reading and understanding the following detailed description with reference to the accompanying figures.

DESCRIPTION OF THE PREFERRED EMBODIMENTS

Examples of the present invention will now be described with reference to the figures.

EXAMPLE 1

A PDA device according to Example 1 of the present invention will now be described with reference to FIGS. 1 and 2.

Figure 1:
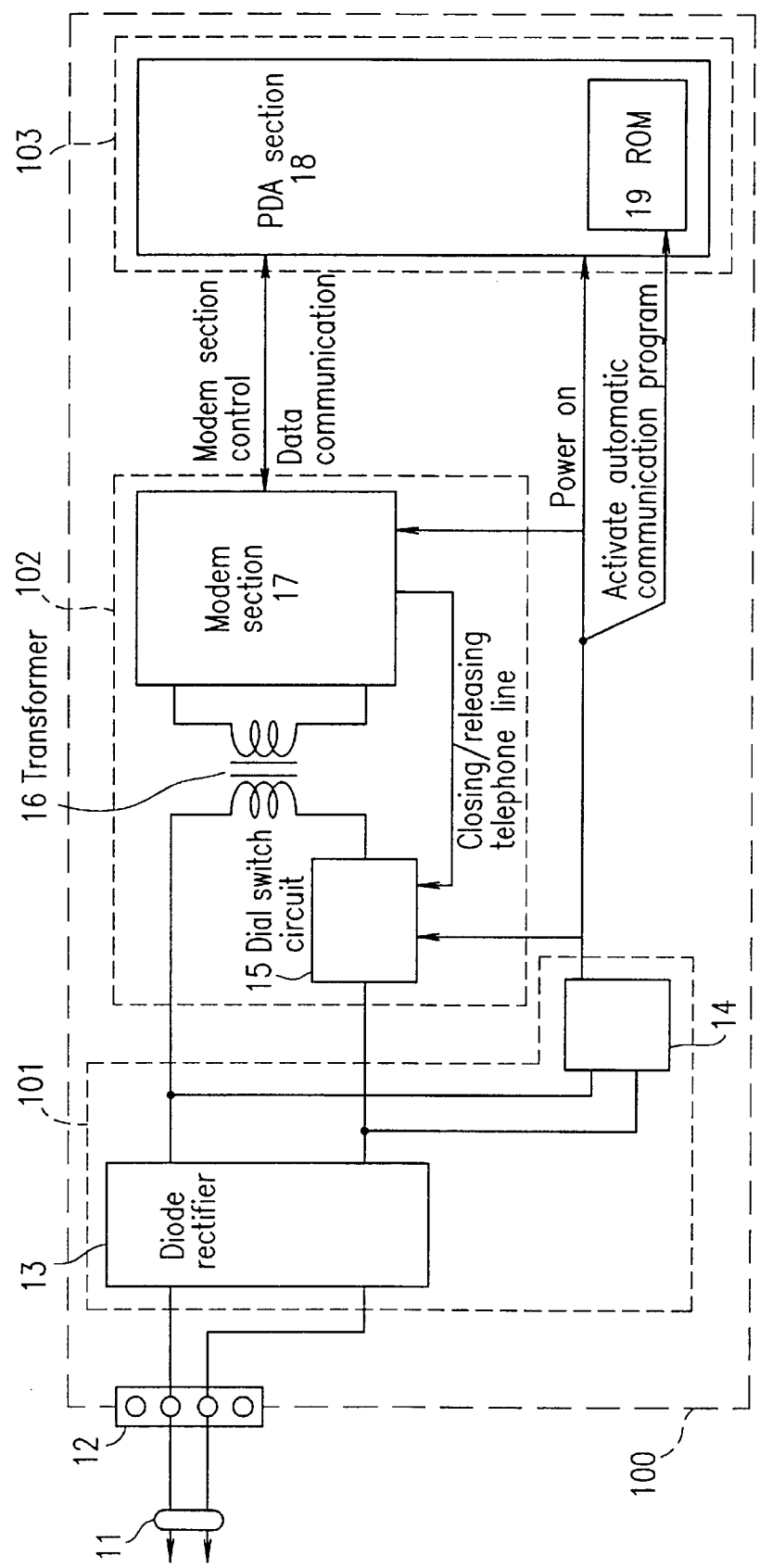
FIG. 1 is a diagram illustrating a PDA device 100.

FIG. 1 illustrates a PDA device 100, which includes: a connection section 12 for connecting the PDA device 100 to a telephone line 11: a power supply control section 101 for detecting a voltage of the telephone line 11 connected by the connection section 12 and for controlling the power supply for a control section 103 based on the detected voltage; a communication section 102 for communicating with other devices via the telephone line 11 connected by the connection section 12; and a control section 103.

The connection section 12 may be a modular plug/jack. Hereinafter, the connection section 12 will be referred to as the "modular jack 12" for illustration purposes only.

The power supply control section 101 includes a diode rectifier 13 for always maintaining the same polarity of the telephone line 11, and a detection section 14 for outputting to the control section 103 a power-on signal when a telephone line voltage of the telephone line 11 is detected.

The communication section 102 dials a telephone number of another device in order to communicate with the other device via the telephone line 11 to which the PDA device 100 is connected by the modular jack 12, transmits data to the other device and then disconnects the telephone line which is connected to a switch board (not shown). Thus, the communication section 102 performs a series of operations, i.e., dialing, data transmission and disconnection.

The communication section 102 includes: a dial switch circuit 15 for opening/closing the loop of the telephone line 11 (i.e., for switching between the on-hook state and the off-hook state) and for outputting a dial pulse signal to the telephone line 11; a transformer 16 for providing isolation between the telephone line 11 and the secondary-side circuit of the communication section 102; a modem section 17 which has a plurality of functions (i.e.: controlling the opening/closing of the loop of the telephone line 11; dialing; connecting itself to another modem; and performing modulating/demodulating device functions by converting the frequency of the digital data transmitted/received to/from a PDA section 18 into the frequency range of the telephone line).

The control section 103 has a PDA section 18 which includes a ROM 19. The ROM 19 stores an automatic communication program in which a series of operations (i.e., dialing, communication and telephone line releasing) have been described.

The control section 103 is activated by a power-on signal output from the detection section 14, and retrieves from the ROM 19 data used for instructing the modem section 17 to perform the series of operations (i.e., dialing, communication and telephone line releasing).

Figure 2:
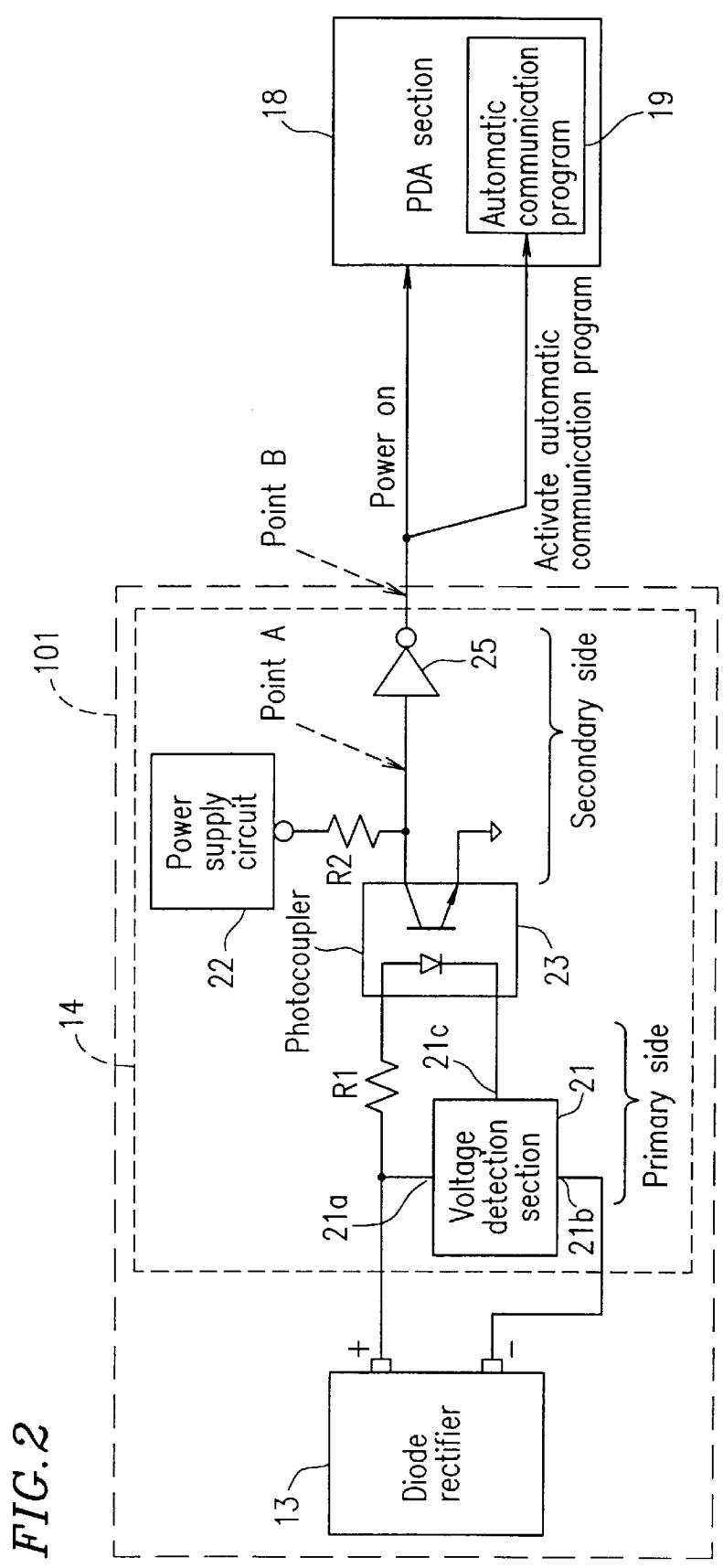
FIG. 2 is a detailed diagram illustrating a power supply control section 101.

FIG. 2 is a detailed diagram illustrating the power supply control section 101.

The detection section 14 includes a voltage detection section 21, a resistor R1, a pull-up resistor R2, a photocoupler 23, an inverter 25 and a power supply 22.

The power supply 22 maybe a battery, a rechargeable battery, or the like, capable of constantly supplying a voltage at a point A.

A telephone line voltage is applied via the diode rectifier 13 to input terminals 21a and 21b of the voltage detection section 21. Then, the modular jack 12 is connected to the telephone line 11. Thus, when a voltage equal to or greater than a predetermined voltage is applied to the input terminals 21a and 21b of the voltage detection section 21, the signal level at the output terminal 21c of the voltage detection section 21 is at an L level, where the PDA device 100 is in the on-hook state.

When the modular jack 12 is not connected to the telephone line 11, that is, when a voltage applied to the input terminals 21a and 21b of the voltage detection section 21 is less than the predetermined voltage, the impedance at the output terminal 21c of the voltage detection section 21 becomes high.

The resistor R1 limits the current flowing through the input side of the photocoupler 23 in order to prevent the switch board (not shown) from misrecognizing that the PDA device 100 is in the off-hook state when the signal level at the output terminal 21c of the voltage detection section 21 is at the L level.

The photocoupler 23 provides isolation between the primary-side circuit of the detection section 14 coupled to the telephone line 11 and the secondary-side circuit of the detection section 14, and transmits a signal output from the voltage detection section 21 to the secondary-side circuit of the detection section 14.

The pull-up resistor R2 is connected to the power supply 22 for pulling up the voltage of the output signal of the photocoupler 23.

The inverter 25 inverts the polarity of the output signal which has been pulled up.

An operation of the supply control section 101 as illustrated in FIG. 2 will now be described.

The modular jack 12 is connected to the telephone line 11, and a voltage is applied to the input terminal of the detection section 14 via the diode rectifier 13.

A telephone line voltage of the telephone line 11 is also applied to the diode rectifier 13. Thus, the diode rectifier 13 always outputs a voltage of the same polarity regardless of the polarity of the telephone line voltage of the telephone line 11. Accordingly, a voltage applied to the detection section 14 always has the same polarity.

The telephone line voltage applied to the input terminal of the detection section 14 is then applied to the input terminals 21a and 21b of the voltage detection section 21. The voltage detection section 21 causes the signal level or the resistance at the output terminal 21c of the voltage detection section 21 to vary based on the voltage applied to the input terminals 21a and 21b.

When the signal level of the output terminal 21c of the voltage detection section 21 becomes low, a current flows through a positive terminal of the diode rectifier 13, the input terminal of the photocoupler 23 and then through the output terminal of the voltage detection section 21, thereby turning on the photocoupler 23.

When the photocoupler 23 is turned on, a current flows from the power supply 22, through the resistor R2 and then through the output terminal of the photocoupler 23, thereby switching the signal level at the point A from an H level to the L level, while switching the signal level at a point B from the L level to the H level.

The variation of the signal level at the point B is used as a power-on signal to turn on the power supply of the PDA section 18.

The power supply 22 may supply a power to the voltage detection section 21 and the inverter 25. When the voltage detection section 21 is a voltage detector such as Rx5VL series or Rx5VT series from RICHO, it is not necessary to apply a voltage other than the telephone line voltage to the voltage detection section 21. In such a case, a power consumption of the PDA device 100 can be reduced, since it is not necessary to constantly supply power to the control section 103.

When the modular jack 12 is connected to the telephone line 11, the power-on signal produced by the detection section 14 turns on the power supply(ies) of the PDA section 18, the modem section 17 and the dial switch circuit 15 shown in FIG. 1. Note that the above power supply(ies) is different from the power supply 22.

The ROM 19 of the PDA section 18 receives the power-on signal as an automatic communication program activation signal. When the automatic communication program activation signal is at the H level, the data stored in the ROM 19 is read out.

The PDA section 18 instructs the modem section 17 to connect the telephone line according to the program stored in the ROM 19, and the modem section 17 outputs a telephone line closing signal to the dial switch circuit 15, thereby connecting the device to the telephone line 11.

The PDA section 18 transmits a predetermined dial number to the modem section 17, and the modem section 17 outputs a dialing signal to the telephone line 11. When another modem included in another device responds to the dialing signal, the modem section 17 is linked to the other modem. Then, the modem section 17 notifies the PDA section 18 that the modem section 17 has been linked to the other modem.

The PDA section 18 transmits/receives data to/from the other modem included in the other device via the modem section 17. When the data transfer is complete, the PDA section 18 instructs the modem section 17 to release the telephone line, and the modem section 17 outputs a telephone line releasing signal to the dial switch circuit 15, thereby disconnecting the PDA device 100 from the telephone line 11.

The above-described steps may be performed by the automatic communication program stored in the ROM 19.

EXAMPLE 2

In Example 2 of the present invention, the modular jack 12 is connected to the telephone line 11, and even after the detection section 14 has detected a voltage equal to or greater than a predetermined voltage, it is possible to select whether or not to turn on the power supply of the PDA section 18 based on a power supply selection signal output from the PDA section 18.

Example 2 is substantially the same as Example 1 except for the structure of a detection section 14' which corresponds to the detection section 14 of Example 1.

Figure 3:
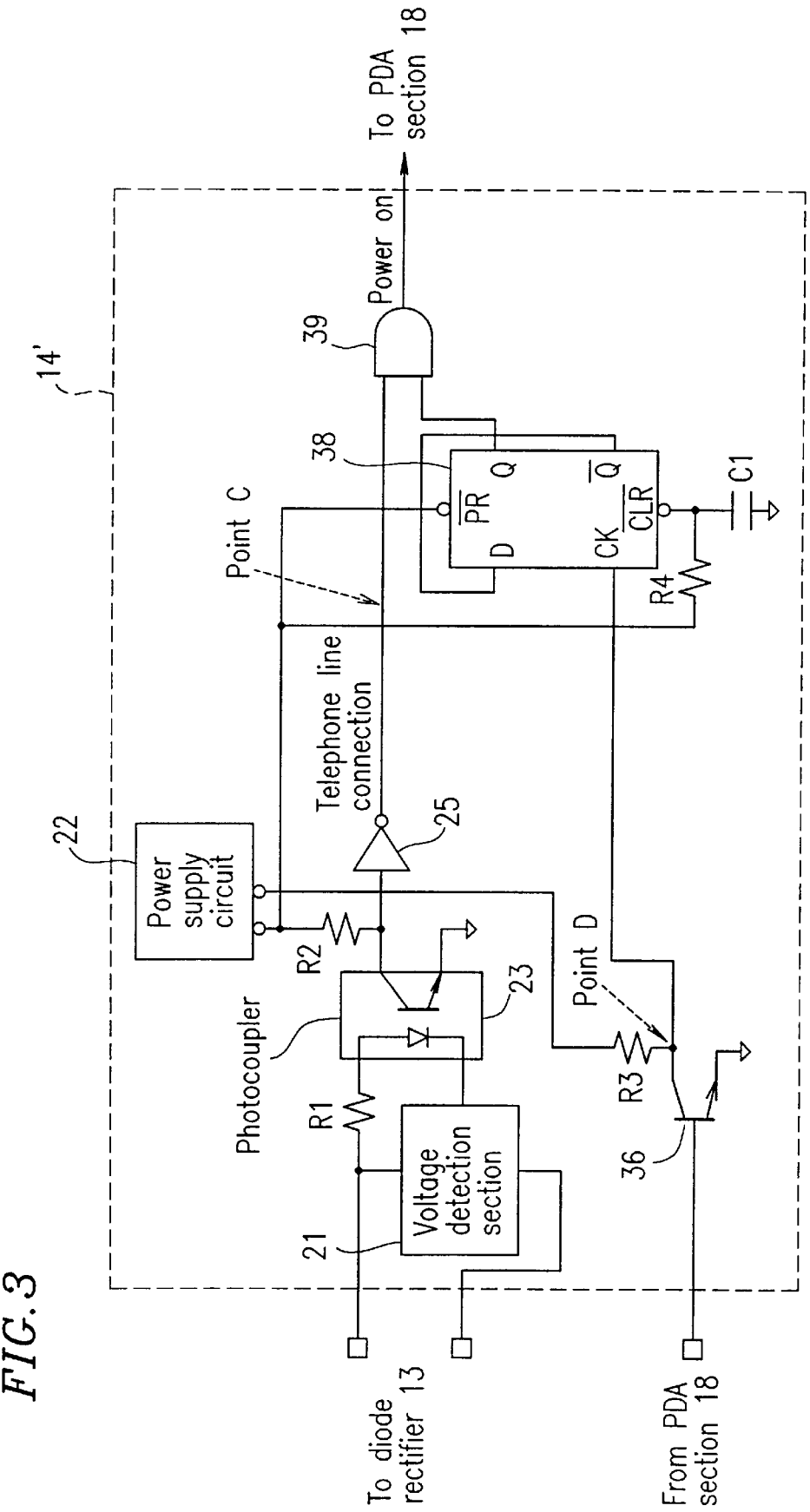
FIG. 3 is a diagram illustrating a structure of a detection section 14' according to Example 2 of the present invention.

FIG. 3 illustrates a structure of the detection section 14' according to Example 2 of the present invention, which includes: the voltage detection section 21; the resistor R1; the pull-up resistor R2; the photocoupler 23; the inverter 25; the power supply 22; a transistor 36; a pull-up resistor R3 for the transistor 36; a flip flop 38; an AND gate 39; and a resistor R4 and a capacitor C1 which are used for delaying signals. The voltage detection 21; the resistor R1; the pull-up resistor R2; the photocoupler 23; the inverter 25; and the power supply 22 in FIG. 3 may be substantially the same as those of Example 1. The flip flop may be a D-type flip flop, e.g., TC74HC74 from Toshiba.

An operation of the detection section 14' of Example 2 will now be described.

As in Example 1, when the modular jack 12 is connected to the telephone line 11, the signal level at the output terminal of the inverter 25 (i.e., at a point C) becomes high.

Once a power supply switching signal (a pulse signal at the H level) is output from the PDA section 18, a logical value of the power supply switching signal is inverted by the transistor 36 and the resistor R3. At a point D, the power supply switching signal is a pulse signal at the L level.

When the power supply 22 is turned on, the /CLR input terminal of the flip flop 38 outputs a signal at the L level by means of a delay circuit including the resistor R4 and the capacitor C1, and the Q output terminal thereof outputs a signal at the L level while the /Q output terminal thereof outputs a signal at the H level.

A power supply switching signal (a pulse signal at the H level) is output from the PDA section 18 to the transistor 36. A falling edge of the power supply switching signal (from the H level to the L level) corresponds to a rising edge (from the L level to the H level) of the signal at the point D. Since the /Q output terminal is connected to the D input terminal, the signal level at the Q output terminal goes from the L level to the H level.

For example, when the modular jack 12 is connected to the telephone line 11 and the telephone line connection signal is at the H level, both of the signals input to the AND gate 39 will be at the H level, and therefore the signal output from the AND gate 39 will be at theH level (a power-on signal), thereby turning on the power supply of the PDA section 18.

Moreover, when the PDA section 18 outputs a power supply switching signal (a pulse signal at the H level) again, the signal level at the Q output terminal of the flip flop 38 goes from the H level to the L level.

For example, even when the modular jack 12 is connected to the telephone line 11, and the telephone line connection signal is at the H level, the signals input to the AND gate 39 will be at the H level and the L level, respectively, since the Q output terminal will be at the L level. Therefore, the signal output from the AND gate 39 will remain at the L level (anon-power-on signal), whereby the power supply of the PDA section 18 will not be turned on.

EXAMPLE 3

Example 3 is substantially the same as Example 2 except for the structure of a detection section 14" which corresponds to the detection section 14' of Example 2.

Figure 4:
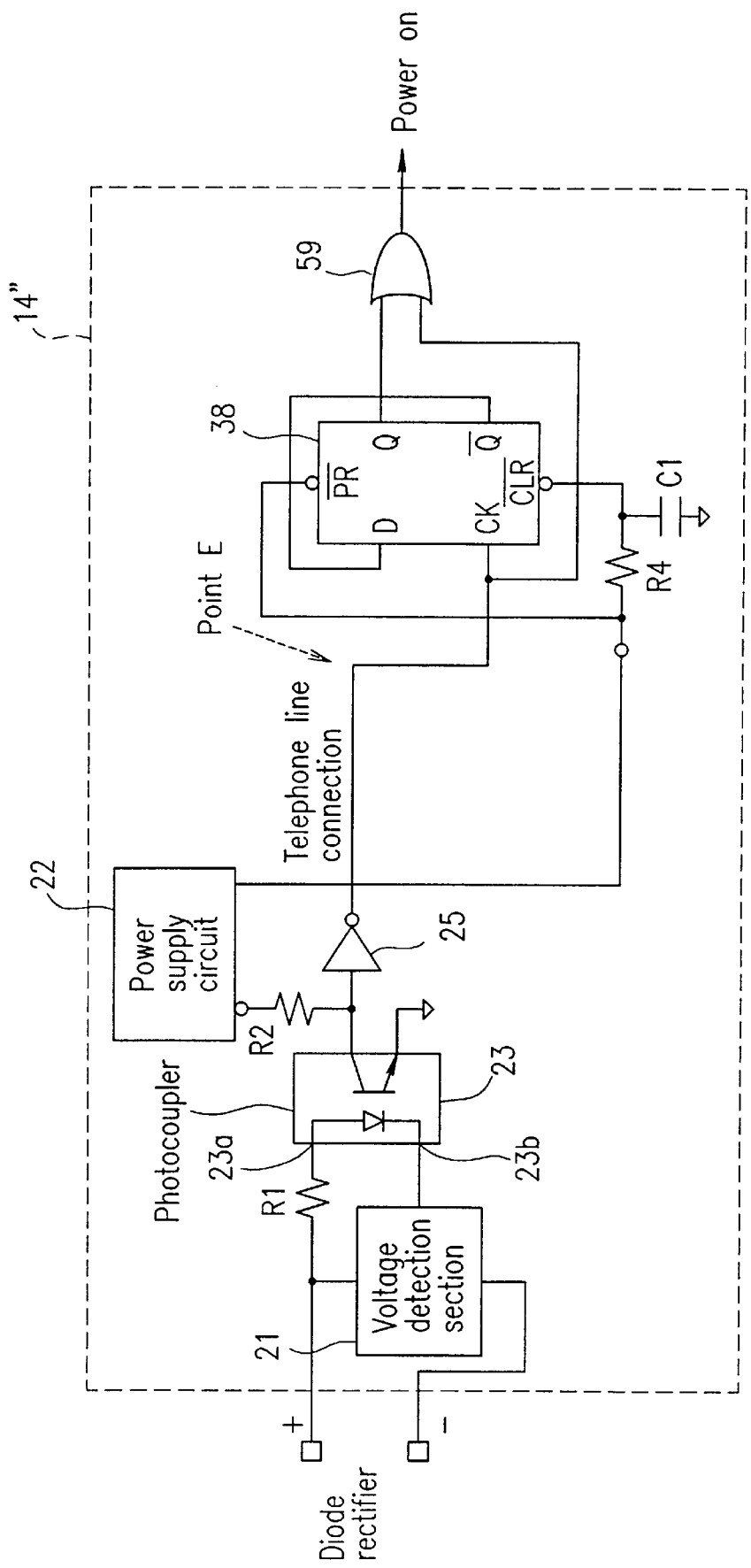
FIG. 4 is a diagram illustrating a structure of a detection section 14" according to Example 3 of the present invention.
Figure 5:
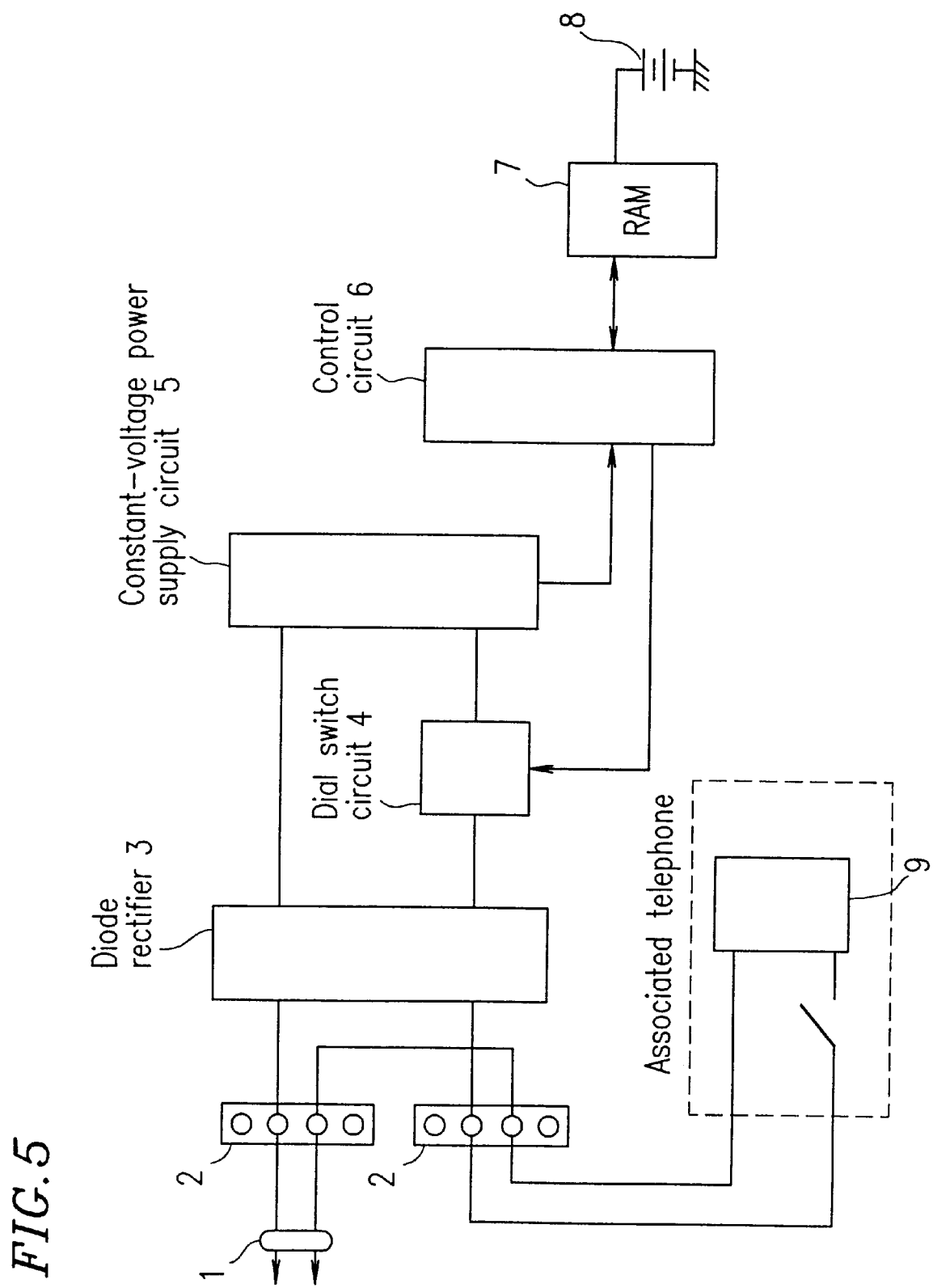
FIG. 5 is a diagram illustrating a conventional automatic dialing unit.

FIG. 4 illustrates a structure of the detection section 14" according to Example 3 of the present invention, which includes: the voltage detection section 21; the resistor R1; the pull-up resistor R2; the photocoupler 23; the inverter 25; the power supply 22; the flip flop 38; an OR gate 59; and the resistor R4 and the capacitor C1 which are used for delaying signals. The voltage detection 21; the resistor R1; the pull-up resistor R2; the photocoupler 23; the inverter 25; the power supply 22; the flip flop 38; and the resistor R4 and the capacitor C1 in FIG. 4 may be substantially the same as those of Example 2.

An operation of the detection section 14" of Example 3 will now be described.

When the modular jack 12 is connected to the telephone line 11, the signal level at the output terminal of the inverter 25 (i.e., at a point E) becomes high.

When the power supply is turned on, the /CLR input terminal of the flip flop 38 outputs a signal at the L level by a delay circuit including the resistor R4 and the capacitor C1, and the Q output terminal thereof outputs a signal at the L level while the /Q output terminal thereof outputs a signal at the H level.

(1) In step S1, the modular jack 12 is connected to the telephone line 11.

When the modular jack 12 is connected to the telephone line 11, the signal level at the point E goes from the L level to the H level. Moreover, since the signal level at the point E goes from the L level to the H level, the signal level at the Q output terminal goes from the L level to the H level. Therefore, each of the signals input to the input terminals of the OR gate 59 will be at the H level, whereby a signal at the H level (a power-on signal) is output from the output terminal of the OR gate 59.

(2) In step S2, the PDA device 100 is placed in the off-hook state.

When the power supply of the PDA section 18 is turned on, the dial switch circuit 15 is closed by the automatic communication program, whereby the PDA device 100 is placed in the off-hook state. When the PDA device 100 is in the off-hook state, the voltage between the terminals of the diode rectifier 13 is divided by a ratio between the impedance of the telephone line 11 and the impedance of the PDA device 100 in the off-hook state, thereby reducing the voltage between the terminals of the voltage detection section 21. Thus, the output terminal of the voltage detection section 21 has a high impedance.

At this point of time, no current is flowing through the input side of the photocoupler 23, whereby no current is flowing between the output terminals of the photocoupler 23. Therefore, the input terminal of the inverter 25 is at the H level, while the output terminal thereof is at the L level.

Although the signal level at the CK input terminal of the flip flop 38 goes from the H level to the L level, the signal level at the Q output terminal of the flip flop 38 is not inverted. Therefore, a signal at the H level is input to the input terminal of the OR gate 59, and the signal output therefrom remains at the H level (a power-on signal).

(3) In step S3, the PDA device 100 is placed in the on-hook state.

When the automatic communication program has completed the communication and released the dial switch circuit 15 and the PDA device 100 is placed in the on-hook state, a telephone line voltage is applied again directly between the terminals of the diode rectifier 13, whereby the output terminal of the voltage detection section 21 is at the L level.

At this point of time, a current from the positive terminal of the diode rectifier 13 flows through the resistor R1, the input terminal 23a of the photocoupler 23, the input terminal 23b of the photocoupler 23 and then through the output terminal of the voltage detection section 21. Thus, the output side of the photocoupler 23 is turned on, whereby a signal at the L level is input to the input terminal of the inverter 25, and the output terminal of the inverter 25 is at the H level.

As a rising edge from the L level to the H level is input to the CK input terminal of the flip flop 38, the signal level at the Q output terminal of the flip flop 38 is inverted.

A signal at the H level from the inverter 25 is input to the input terminal of the OR gate 59, and the signal output therefrom remains at the H level.

(4) In step S4, the modular jack 12 is disconnected.

When the modular jack 12 is disconnected, the signal level at the point E goes from the H level to the L level.

Although a falling edge from the H level to the L level is input to the CK input terminal of the flip flop 38, the signal level at the Q output terminal of the flip flop 38 is not inverted. Signals at the L level are input to the respective input terminals of the OR gate 59, whereby the output terminal of the OR gate 59 is at the L level.

As described above, when the modular jack 12 is connected, a signal at the H level is produced which instructs turning on of the PDA section. When the modular jack 12 is disconnected, a signal at the L level is produced which instructs turning off of the PDA section 18.

Due to such a structure, the switching of the power supply of the PDA section 18 can be controlled in a desirable manner. The power supplies of the dial switch circuit 15, the modem section 17, and the PDA section 18 are turned on when the modular jack 12 is connected, after which automatic communication is performed. Then, the power supplies of the dial switch circuit 15, the modem section 17, and the PDA section 18 can be turned off by disconnecting the modular jack 12.

Various other modifications will be apparent to and can be readily made by those skilled in the art without departing from the scope and spirit of this invention.

Accordingly, it is not intended that the scope of the claims appended hereto be limited to the description as set forth herein, but rather that the claims be broadly construed.

What is claimed is:

1. A personal digital assistance device for communicating with another device via a telephone line, the personal digital assistance device comprising:

a connection section for connecting the personal digital assistance device to the telephone line;

a communication section for dialing a telephone number of the other device, for transferring data between the devices, and for disconnecting the telephone line, thereby communicating with the other device via the telephone line to which the personal digital assistance device is connected by the connection section;

a control section for controlling the communication section;

a voltage detection section for detecting a voltage of the telephone line to which the personal digital assistance device is connected by the connection section; and a determination section for determining whether the voltage detected by the voltage detection section is equal to or greater than a predetermined voltage, wherein when the determination section determines that the voltage detected by the voltage detection section is equal to or greater than the predetermined voltage, the determination section turns on a power supply for supplying power to the control section.

2. A personal digital assistance device according to claim 1, wherein:

the personal digital assistance device includes a setting section for setting whether to turn on or off the power supply; and when the determination section determines that the voltage detected by the voltage detection section is equal to or greater than the predetermined voltage, the determination section turns on or off the power supply according to a setting made by the setting section.

3. A personal digital assistance device according to claim 1, wherein when it is determined that the voltage detected by the voltage detection section is less than the predetermined voltage after the control section has been connected to the other device via the telephone line to which the personal digital assistance device is connected by the connection section, the determination section turns off the power supply.

4. A personal digital assistance device according to claim 1, wherein when the determination section supplies a power to the control section, the determination section instructs the communication section to dial a predetermined telephone number, to transmit predetermined data to the telephone line and then to disconnect the telephone line.

* * * * *